UNITED STATES PATENT OFFICE.

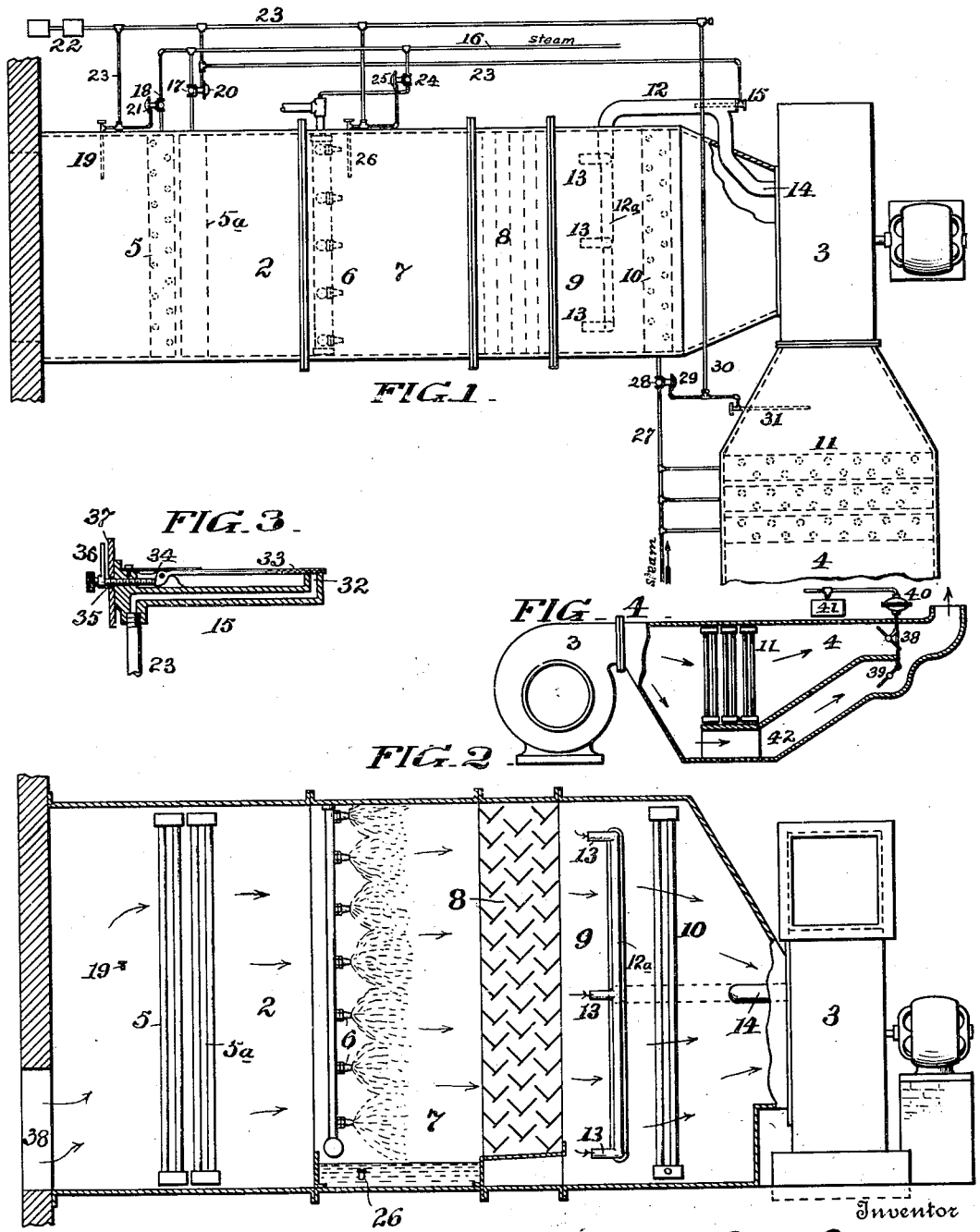

WILLIAM G. R. BRAEMER, OF CAMDEN, NEW JERSEY, ASSIGNOR TO WARREN WEBSTER & COMPANY, A CORPORATION OF NEW JERSEY.

HUMIDIFYING APPARATUS.

1,101,901.  Specification of Letters Patent.  Patented June 30, 1914.

Application filed April 2, 1913. Serial No. 758,297.

*To all whom it may concern:*

Be it known that I, WILLIAM G. R. BRAEMER, citizen of the United States, and resident of Camden, county of Camden, and State of New Jersey, have invented an Improvement in Humidifying Apparatus, of which the following is a specification.

The object of my invention is to provide an apparatus by which an improved method may be practised to obtain a reasonably exact humidified condition of the air to be delivered for use, and so that the average condition of the humidified air thus produced may be maintained very closely, approximately to the predetermined theoretical condition required, the maintenance of this humidified condition of the air being automatically controlled.

In carrying out the method of operation which may be performed in my improved apparatus, the fresh air is first subjected to the heat from tempering coils, and then to an aqueous vapor to impart to the warm air the requisite quantity of moisture to provide an absolute humidity at the temperature there prevailing, which will, when the humidified air is re-tempered or re-heated, impart a temperature which in the subsequent use of the humidified air will furnish the condition which is required in the room or place to which the air is conveyed, and this absolute humidity is maintained accurately by controlling the heating of the inflowing air by means of a device such as a humidistat or thermostat when subjected to average mixture of different portions of air which has been humidified. Heretofore, the regulation of the temperature conditions has been done by humidistats or thermostats arranged at some one place in the general flow of humidified air before it reaches the blower, but owing to the fact that different strata or portions of the air passing through the large passageway or casing of the apparatus, is frequently very different, the regulations of humidity conditions based upon this condition at one place would not be consistent with the requirement at another place in said body of air. By the use of my invention, as many samples of the air as are desired are simultaneously drawn off and automatically mixed, and this average mixture of air, thus taken, being a fair average of the entire body of humidified air, is caused to act upon a humidistat or thermostat, which in turn controls the conditions within the apparatus for causing the fresh air to take up more or less moisture as the conditions may require to insure the proper humidification of the air to be delivered in a tempered condition to the blower and maintain it as constant as possible. The drawing off of the samples, for purposes of acting upon the controlling device may be accomplished by the action of the usual blower, sucking upon a tubular conduit terminating within the apparatus in suction nozzles, so as to obviate the employment of any additional suction creating devices. In this manner, the samples of air are continuously taken at every moment of the operation of the apparatus, and are being mixed together and the moisture therein and the temperature thereof made to constantly act upon the humidistat or thermostat, so that a most accurate regulation of the moisture and temperature conditions of the air are accomplished.

This application is directed more particularly to the apparatus for carrying out the above described method, the claims for the method being made the subject matter of a divisional application, Ser. No. 827,834, filed March 28, 1914.

Broadly considered, the apparatus consists of any suitable humidifying means for causing a flowing current of air to absorb more or less moisture, combined with means for collecting a plurality of samples of the flowing body of humidified air and mixing them to provide a common average sample, and regulating means for varying the conditions which insure a variable amount of moisture to be absorbed by the flowing current of air under the control of devices actuated by the condition of the average sample of humidified air at any moment.

My invention will be better understood by reference to the drawings, in which:

Figure 1 is a plan view of the humidifying apparatus embodying my invention, and in which my improved method for humidity regulation may be carried out; Fig. 2 is a sectional elevation of the same; Fig. 3 is a sectional elevation of one form of controlling device for use in connection with my improved apparatus and method; and Fig. 4 is a diagrammatic elevation of a portion of the apparatus.

2 is the tubular casing or body of the apparatus and provides a longitudinal passageway which receives, at one end, fresh air, through a port or opening 38 and delivers the humidified air at the other end by means of a blower 3, which is operated by a suitable motor, said blower delivering the air to the conduit 4, which leads to the room or place of use. The tubular passage 2 contains in its length, apparatus for heating, supplying moisture, removing excess moisture and for further tempering or reheating. The fresh air, on entering, is brought in contact with the tempering coils 5 and 5ª, the temperature of which may be automatically regulated as hereinafter described. The heated or tempered air is then passed into the humidifying compartment 7 in which saturated vapor from nozzles 6 is projected to impart to the heated air the moisture which is required to be absorbed. This saturated vapor is formed from water which is heated, by means of steam, to a greater or less extent to suit the conditions prevailing in compartment 7. The surplus moisture carried by the air is removed by the eliminator structure 8, and the air which passes into the compartment 9 should then be in the condition in which it will have the necessary absolute quantity of moisture to meet the requirements of the air conditions to be delivered to the room; but the absolute humidity which is contained by the air at this point is utilized to provide the lower relative humidity which the air must have after it has been raised in temperature to the condition required when it is delivered to the room and this increase of temperature and lowering of the relative humidity may be performed by the coils 10 and 11, the coils 11 being provided to give a large amount of the heat necessary to raise a portion of the humidified air and which, when mixed with a proper portion of the tempered or reheated air from the coils 10, will give the proper relative humidity required in the usual manner. The regulation, to maintain a constant temperature of the air before reaching the coils 11, is accomplished by the use of the coil 10, which is automatically controlled. The coil 10 is shown in conduit 2 between the nozzles 13 and blower 3, but this position is not essential as it would suffice for its purpose if placed at any place between said nozzles and the reheating coils 11; I, however, prefer to place it as shown. The steam which is supplied to these coils at 10 and 11 is furnished by the steam pipes 27, and the supply of steam to the regulating or tempering coil 10 is controlled by the steam valve 28, which is operated by the motor 29 under the control of the thermostat 31 in the conduit for the air after it leaves the coils 10, and preferably as it leaves the blower.

As shown in Fig. 4, the humidified tempered air leaving the blower is divided, part passing through the reheating coils 11 and part passing through a by-pass 42 about said coils. The proper mixture of the air from the by-pass 42 and that from the reheating coils (higher temperature) may be secured by the regulating valves 38 and 39 under the control of the motor 40 and thermostat or humidistat 41 in the usual way.

The supply of steam to the spray water, to give it the proper temperature before being sprayed by the nozzles 6, is regulated by a valve 24, operated by a motor 25, said motor being controlled by the thermostat 26 extending into or arranged in the compartment 7. Steam is supplied by the pipe 16 which connects with the valve 24 by a branch pipe. Similarly, steam from this pipe 16 is supplied to the tempering coil 5 under the control of a valve 18 and to the tempering coil 5ª under the control of a valve 17. The valve 18 is operated by a motor 21, controlled by the thermostat 19 within the inlet end of the casing, and the valve 17 is operated by a motor 20 under the control of the controlling device 15, which is responsive to variations in the average condition of the warm humidified air before passing to the blower and coils 10, previously referred to in a general way and now to be specifically referred to.

More specifically referring to the means of controlling the tempering coils 5ª, to vary the temperature of the inflowing air to be humidified and thereby varying this capacity for absorbing more or less moisture to compensate for variations in the humidity and temperature conditions in the outside atmosphere from which the fresh air is drawn into the apparatus, I provide a plurality of suction nozzles 13, in the compartment 9 back of the eliminator, said nozzles communicating with pipes 12ª discharging into a conduit 12 which empties by an outlet 14 into the suction part of the blower or fan 3, so that the normal action of the blower or fan for drawing air through the humidifying apparatus also draws the air through the various nozzles 13, causing it to pass as a mixture through the conduit 12, and in which conduit it is caused to act upon the controller 15 which may be a humidistat or thermostat. By its variation in humidity conditions, the air causes the controller to act to control the motor 20 in its function of regulating the amount of steam which is supplied to the regulating tempering coils 5ª. As indicated in the drawings, there are a number of these suction nozzles 13, but this is by way of example only, as I do not restrict myself in this regard, as it is manifest that the greater the number of such nozzles, the more accurate will be the average mixture sample of air which passes from the apparatus.

The construction of the controller 15, when employed as a humidistat, may be of the form set out in the patent to Edward W. Comfort, No. 977,933 and dated December 6, 1910, or of any other suitable construction. Similarly, the thermostats may be of any suitable construction, and for example the construction shown in Fig. 3 may be used. In this figure, 32 is an air nozzle into which air is sucked by pipe 23, said nozzle being controlled by a thermostatic valve 33 hinged to the body, said valve being adjusted to open the nozzle for any given temperature by the screw 35 having a pointer 36 movable over a temperature dial 37. A spring 34 acts to hold the valve 33 against the screw. This device may be used as the controlling means 15, if so desired. The suction of air through the nozzle of the thermostat or humidistat is produced by a small vacuum pump 22 and suction mains 23 in the usual manner.

In describing my invention, more particularly in its preferred form, I have varied the amount of steam supplied to the spray water for the purpose of maintaining it at a sufficiently high and at a substantially constant temperature as will insure the proper absorption of moisture by the air when the same is subjected to the heating action of the tempering coils supplemented by the warm water, and I have regulated the tempering coils under the control of the average sample of the humidified air; but it is to be understood that any other suitable manner of causing the inflowing air to take up the proper moisture to bring it to the requisite humidity condition may be employed, and cause the same to be regulated under the control of the average sample of the humidified air, as any method in which a variation in temperature of the air or moisture or both is employed, may be used in obtaining the general humidity conditions, namely, the absorption by the air of a definite quantity of moisture to give the requisite absolute humidity, and this be controlled to a practically constant condition under the regulating means employing the average sample, as hereinbefore described.

I have shown the apparatus in the form I have preferred for the practical carrying out of the method herein described, but I do not restrict myself to the details of the apparatus, as these may be modified without departing from the spirit of the invention.

Having now described my invention, what I claim as new and desire to secure by Letters Patent, is:—

1. The combination in a humidifying apparatus, of a passage, means for supplying fresh air in heated condition thereto, a blower for drawing the air through the passage, means for supplying vapor of water to the heated air passing through the passage to humidify the same, nozzles arranged in the same cross section of the passage for simultaneously drawing off a plurality of different samples from different portions of the same cross section of the body of the humidified air before passing to the blower, a conduit for mixing the samples of humidified air so drawn off, means for automatically varying the temperature of the air before being treated to the vapor of water, and controlling devices governed by the conditions of the mixed air samples in the conduit for controlling the means for automatically varying the temperature of the air, whereby the amount of moisture in the air passing to the blower may be maintained substantially constant.

2. A humidifying apparatus, comprising a tubular passage open at one end to the atmosphere, combined with a blower sucking on the contents of the passageway at its other end, means to supply an aqueous vapor of substantially constant temperature to the air passing through the passageway, a heating coil for tempering the fresh air on its way from the atmosphere to the means for supplying the aqueous vapor, a suction conduit provided with a plurality of nozzles arranged in different parts of the same cross section of the tubular passage and between the means for supplying aqueous vapor and the blower whereby a plurality of samples of the humidified air may be simultaneously drawn off from the different portions of the same cross section of the body of humidified air and mixed to provide an average sample, and means controlled by the condition of the average sample of air in the conduit for controlling the temperature of the tempering coils, whereby the inflowing fresh air is varied in temperature to provide the conditions necessary for insuring a substantially constant humidity to the humidified air.

3. A humidifying apparatus, comprising a tubular passage open at one end to the atmosphere, combined with a blower sucking on the contents of the passageway at its other end, means to supply an aqueous vapor of substantially constant temperature to the air passing through the passageway, a heating coil for tempering the fresh air on its way from the atmosphere to the means for supplying the aqueous vapor, a suction conduit provided with a plurality of nozzles arranged in different parts of the same cross section of the tubular passage and between the means for supplying aqueous vapor and the blower whereby a plurality of samples of the humidified air may be simultaneously drawn off from the different portions of the same cross section of the body of humidified air and mixed to provided an average sample, an eliminator interposed between the means for supplying aqueous vapor to the air and the plurality of nozzles for drawing off the different samples of the humidified air to remove the mechanically suspended moisture from the air before taking the samples, means controlled by the condition of the average sample of air in the conduit for controlling the temperature of the tempering coils, and means for heating the humidified air for lowering its relative humidity said means arranged to act upon the air after it passes the plurality of nozzles, whereby the inflowing fresh air is varied in temperature to provide the conditions necessary for insuring a substantially constant humidity to the humidified air.

4. A humidifying apparatus, comprising a tubular passage open at one end to the atmosphere, combined with a blower sucking on the contents of the passageway at its other end, means to supply an aqueous vapor of substantially constant temperature to the air passing through the passageway, a heating coil for tempering the fresh air on its way from the atmosphere to the means for supplying the aqueous vapor, a suction conduit provided with a plurality of nozzles arranged in different parts of the same cross section of the tubular passage and between the means for supplying aqueous vapor and the blower whereby a plurality of samples of the humidified air may be simultaneously drawn off from the different portions of the same cross section of the body of humidified air and mixed to provide an average sample, means controlled by the condition of the average sample of air in the conduit for controlling the temperature of the tempering coils, and means for heating the humidified air for lowering its relative humidity said means arranged to act upon the air after it passes the plurality of nozzles, whereby the inflowing fresh air is varied in temperature to provide the conditions necessary for insuring a substantially constant humidity to the humidified air.

5. In a humidifying apparatus, the combination of a tubular passage through which a current of air is caused to pass, means in said passage for causing the flowing air to absorb a variable quantity of moisture, means for simultaneously drawing off a plurality of samples of the humidified air from different portions of the same cross section of the tubular passage and mixing the same to form an average sample, and means controlled by the conditions of the average sample of the humidified air for controlling the means for causing the air to absorb the variable quantity of moisture, whereby the amount of moisture absorbed by the air may be automatically increased or decreased to provide a substantially constant amount of moisture in the humidified air delivered by the apparatus.

6. In a humidifying apparatus, a tubular passage, means for circulating air through the passage, means for supplying to the air both an increase of temperature and moisture, means for simultaneously drawing off a plurality of samples of the humidified air from different portions of the same cross section of the tubular passage and mixing them to form an average sample, means for varying the amount of heat impressed upon the air in the process of humidification, and devices governed by the conditions of the average mixture of the air samples for controlling the said means for varying the amount of heat impressed upon the air in the process of humidification, whereby the amount of moisture in the humidified air being delivered may be maintained substantially constant.

In testimony of which invention, I hereunto set my hand.

WILLIAM G. R. BRAEMER.

Witnesses:
BENJAMIN NELSON,
R. M. KELLY.